United States Patent [19]

Moore, III

[11] Patent Number: 5,709,171
[45] Date of Patent: Jan. 20, 1998

[54] DISPOSABLE CAT LITTER BOX

[76] Inventor: Johnnie Moore, III, P.O. Box 23733, Oakland, Calif. 94623-0733

[21] Appl. No.: 586,108

[22] Filed: Jan. 16, 1996

[51] Int. Cl.⁶ ................................................. A01K 29/00
[52] U.S. Cl. ........................................ 119/170; 119/167
[58] Field of Search ................................ 119/170, 167

[56] References Cited

U.S. PATENT DOCUMENTS

| | | | |
|---|---|---|---|
| 4,349,104 | 9/1982 | Hayes | 206/205 |
| 4,615,300 | 10/1986 | McDonough | 119/1 |
| 4,760,816 | 8/1988 | Rhodes | 119/1 |
| 4,813,374 | 3/1989 | Sides | 119/1 |
| 4,836,141 | 6/1989 | Whitfield | 119/1 |
| 4,919,078 | 4/1990 | Morrison | 119/1 |
| 5,062,392 | 11/1991 | Lavash | 119/167 |
| 5,065,702 | 11/1991 | Hasiuk | 119/168 |
| 5,158,042 | 10/1992 | Hammerslag et al. | 119/167 |

*Primary Examiner*—Edgar S. Burr
*Assistant Examiner*—Dave A. Ghatt

[57] ABSTRACT

A disposable cat litter box includes a supporting base and a removable, disposable bag of litter which is designed to fit inside of the base. The disposable bag is provided with a draw string to facilitate its closure after use, and a cardboard bottom inside of the bag provides for a conforming fit of the bag within the base. In a modified embodiment, a plurality of disposable bags are nested inside of the base, and each bag is of a pleated structure with small reinforcement wires going in vertical and horizontal directions. This allows one side of the bag to be lifted upwardly within the base so as to form a deflecting shield which reduces the amount of litter spillage from the bag during a use of the box by a cat.

4 Claims, 3 Drawing Sheets

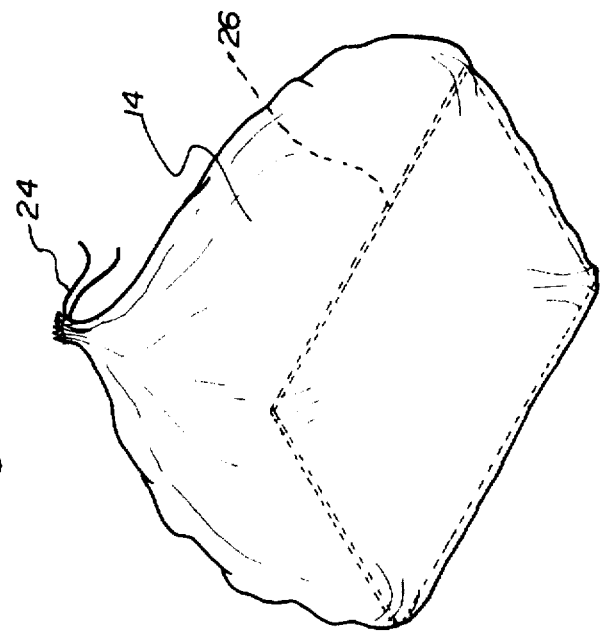
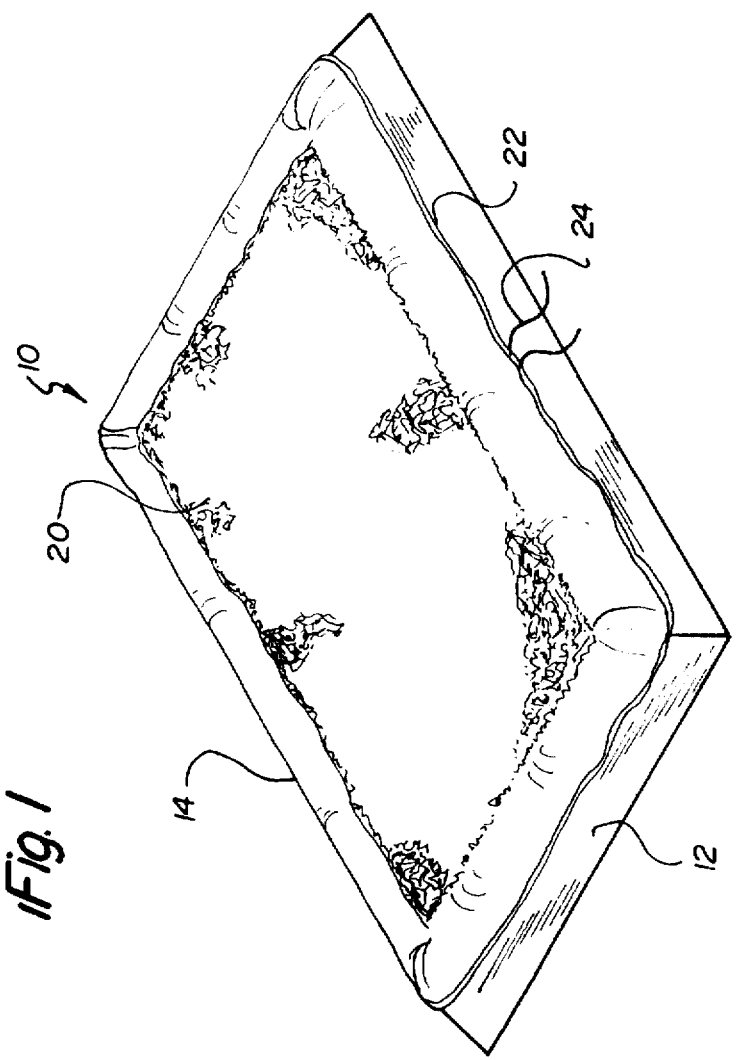

DISPOSABLE CAT LITTER BOX

BACKGROUND OF THE INVENTION

1. Field of the Invention

The present invention pertains to cat litter boxes, and more particularly pertains to a cat litter box of a disposable construction.

2. Description of the Prior Art

The use of cat litter boxes is well known in the prior art. This is evidenced by the granting of a number patents relating to various functional and structural aspects of such litter boxes, and there are many examples of litter boxes which have received U.S. Patents. While each of these prior art patents disclose litter boxes which fulfill their respective particular objectives and requirements, and are most likely quite functional for their intended purposes, it will be noticed that none of these patents disclose a litter box which includes a litter-filled bag that is capable of being shaped to limit the amount of litter ejected therefrom by a cat. As such, them apparently still exists the need for improved disposable litter boxes which are designed to limit the amount of litter which can be ejected therefrom during use, and in this respect, the present invention substantially fulfills this need.

SUMMARY OF THE INVENTION

In view of the foregoing disadvantages inherent in the known types of disposable cat litter boxes now present in the prior art, the present invention provides a new disposable cat litter box having advantages and improvements which are patentably distinct over similar devices and methods which may already be patented or commercially available. As such, the general purpose of the present invention, which will be described subsequently in greater detail, is to provide a disposable cat litter box and method which has many of the advantages of the disposable cat litter boxes mentioned heretofore while being operable to overcome problems not presently addressed by the prior art.

To attain this, the present invention generally comprises a disposable cat litter box which includes a supporting base and a removable, disposable bag of litter which is designed to fit inside of the base. The disposable bag is provided with a draw string to facilitate its closure after use, and a cardboard bottom inside of the bag provides for a conforming fit of the bag within the base. In a modified embodiment, a plurality of disposable bags are nested inside of the base, and each bag is of a pleated structure with small reinforcement wires going in vertical and horizontal directions. This allows one side of the bag to be lifted upwardly within the base so as to form a deflecting shield which reduces the amount of litter spillage from the bag during a use of the box by a cat.

There has thus been outlined, rather broadly, the more important features of the invention in order that the detailed description thereof that follows may be better understood, and in order that the present contribution to the art may be better appreciated. Them are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new disposable cat litter box and method which has many of the advantages of the disposable cat litter boxes mentioned heretofore and many novel features that result in a disposable cat litter box which solves problems not presently addressed in the prior art.

It is another object of the present invention to provide a new disposable cat litter box which may be easily and efficiently manufactured and marketed.

It is a further object of the present invention to provide a new disposable cat litter box which is of a durable and reliable construction.

An even further object of the present invention is to provide a new disposable cat litter box which is susceptible of a low cost of manufacture with regard to both materials and labor, and which accordingly is then susceptible of low prices of sale to the consuming public, thereby making such disposable cat litter box economically available to the buying public.

Still yet another object of the present invention is to provide a new disposable cat litter box which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a first embodiment of the disposable cat litter box comprising the present invention.

FIG. 2 is a bottom perspective view of the disposable bag utilizable with the first embodiment of the invention.

3

Figure 3:
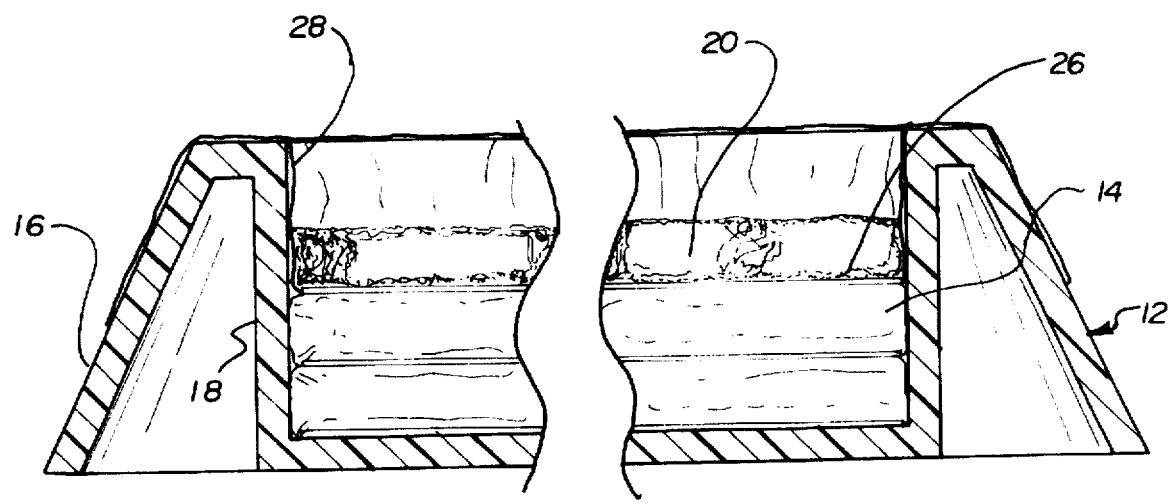

FIG. 3 is cross-sectional view of the first embodiment of the invention.

Figure 4:
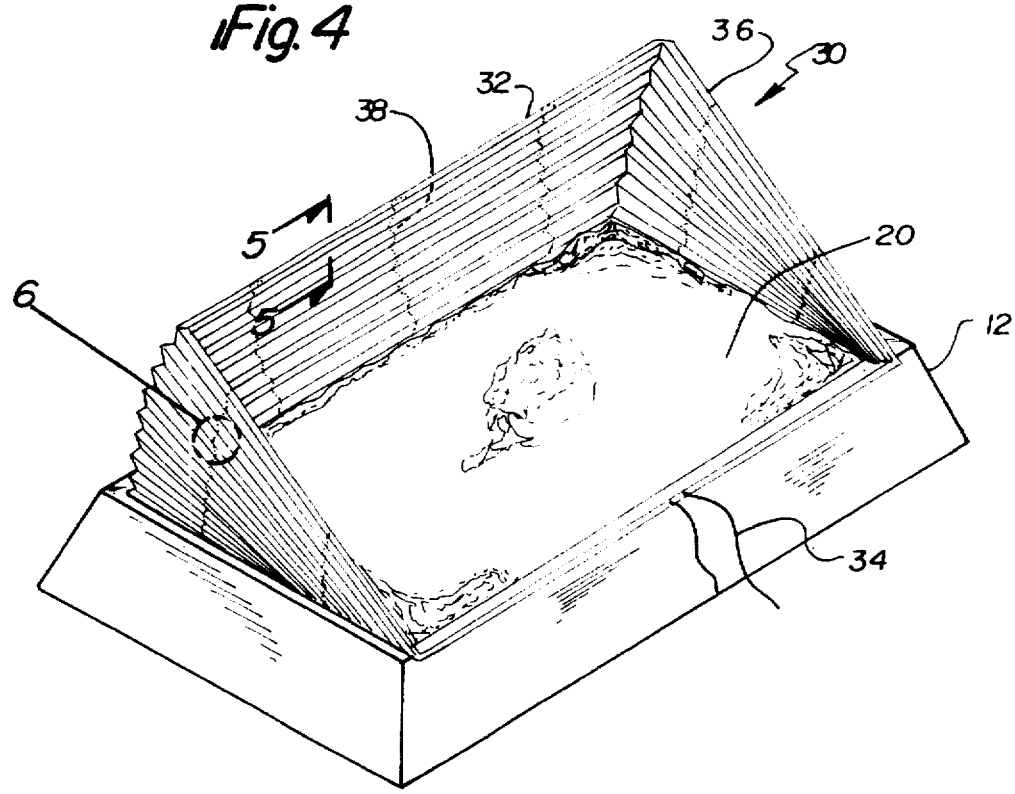

FIG. 4 is a perspective view of a second embodiment of disposable cat litter box.

Figure 5:
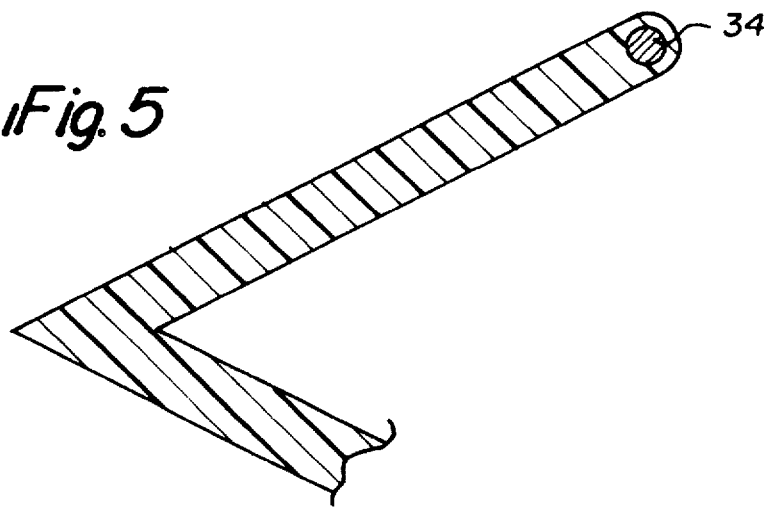

FIG. 5 is a cross-sectional view of the invention as viewed along the line 5—5 in FIG. 4.

Figure 6:
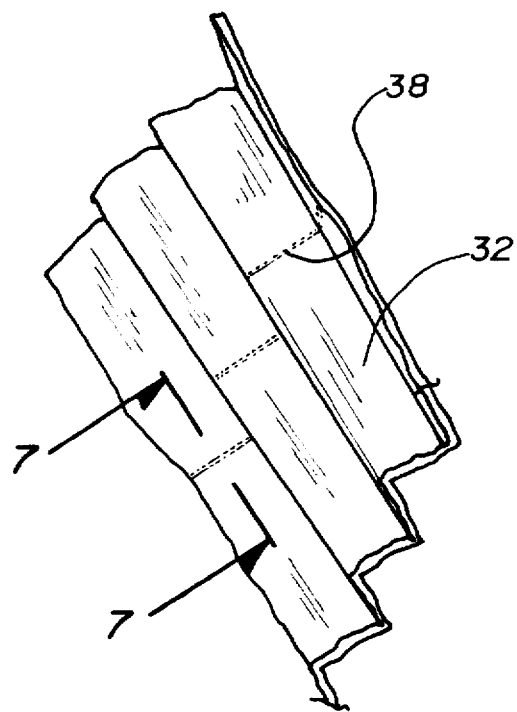

FIG. 6 is an enlarged detail view of the invention taken from FIG. 4 of the drawings.

Figure 7:
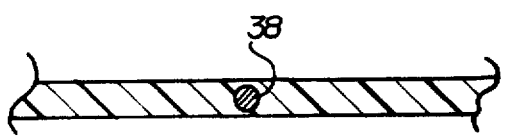

FIG. 7 is a cross-sectional view of the invention as viewed along the line 7—7 in FIG. 6.

DESCRIPTION OF PREFERRED EMBODIMENTS

With reference now to the drawings, and in particular to FIGS. 1–3 thereof, a new disposable cat litter box embodying the principles and concepts of the present invention and generally designated by the reference numeral 10 will be described.

More specifically, it will be noted that the disposable cat litter box 10 in a first embodiment thereof includes a rectangularly-shaped base 12 in which a plurality of litter carrying bags 14 can be stored in a nested arrangement as best illustrated in FIG. 3. The box 12 is of a trapezoidal shape and in the preferred embodiment 10, it would be preferably molded of a sturdy plastic. The trapezoidal shape of the box 12 provides for outwardly flared sides, all of which are generally designated by the reference numeral 16, that are integrally attached to vertical sides 18, and these outwardly flared sides provide stability to the base so that a cat can not easily tip it over.

Each litter bag 14 is filled with a supply of conventional litter 20 and is openable from a top surface. The top edge 22 of each bag 14 is provided with an encased drawstring 24 so as to facilitate an opening and closing of the bag 14 when desired. Additionally, a bag shaped retention means is provided. Preferably the bag shaped retention means is a rectangularly-shaped sheath of cardboard 26 is positioned beneath the litter 20 in each bag 14, and the cardboard is shaped to conformingly fit within an interior area 28 of each base 12, thereby to provide a fixed shape of the bag 14 within the base which then prevents dislodgement of the bag from the base during a use thereof by a cat. The ability of the cardboard 26 to maintain the bag 14 in a conforming and tight fitting shape within the base 12 is illustrated in FIG. 2, as is the use of the drawstring 24 to effect a closure of the bag when desired.

FIGS. 4, 5, 6 and 7 illustrate a second embodiment of the invention which is generally designed by the reference numeral 30. In this respect, the embodiment 30 is provided with a plurality of nestably stored bags 32, each of which is provided with a supply of conventional litter 20 in the manner of the aforementioned bag 14. As shown, the bag 32 is of a pleated construction and includes a drawstring 34 which is constructed of a thin metallic wire. The drawstring 34 operates to maintain a top edge 36 of the bag 32 in a rectangular shape, but is still flexible enough to be drawn tightly in a manner which will facilitate a closing of the bag when a disposal thereof is desired.

While the wire 34 extends completely around a peripheral horizontal edge of bag 32, it can be seen that there is also provided a plurality of spaced-apart, vertically aligned wires 38 which are formed directly in the bag material as illustrated in FIGS. 6 and 7. These wires 38 may be formed of the same type of wire that the wire 34 is formed from and they provide stiffness to the accordion shape of the bag 32, whereby it is maintained in its pleated form.

As shown in FIG. 4, once a bag 32 is opened for use by a cat, a user can pull up one side of the bag whereby the pleats open in an accordion-like manner and the wires 38 hold the bag upwardly at a desired position as shown. In this configuration, a cat utilizing the liter 20 in the bag 32 will be able to eject litter outwardly from the bag in one direction only with three sides of bag serving as a barrier against litter spillage around the base 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new and improved disposable cat litter box comprising:

a base;

at least one disposable bag retained removably positioned within said base;

a supply of cat litter contained within said bag; and a bag shaped retention means associated with said bag and being operable to maintain said bag in a desired shape so as to guard against a dislodgement of said bag from said base during a use thereof by said cat, said bag shape retention means comprises a section of disposable stiff cardboard positioned interiorly of said bag beneath said supply of cat litter, said bag shape retention means includes stiffened pleats for holding said bag in said desired shape; and a litter deflection means for directing litter displaced by a cat back into said bag, said deflection means having a deflection shield formed by a sidewall of said bag, said deflection shield being selectively pulled into an upstanding litter deflection position, said deflection shield is of a pleated structure defined by a plurality of pleats formed in said side wall of sad bag.

2. The new and improved disposable cat litter box as described in claim 1 wherein said plurality of pleats are provided with a shape retaining stiffness in a vertical direction by a plurality of vertically aligned bendable wires retained within said sidewall of said bag.

3. The new and improved disposable cat litter box as described in claim 2 wherein said plurality of pleats are provided with a shape retaining stiffness in a horizontal direction by a drawstring positioned along a top edge of said bag and comprising a bendable wire shaped to keep said top edge of said bag in an open condition.

4. The new and improved disposable cat litter box as described in claim 3 wherein said bag shape retention means further includes said vertically aligned bendable wires retained within said pleats of said sidewall.

* * * * *